United States Patent [19]

Patinet et al.

[11] 4,107,802
[45] Aug. 22, 1978

[54] APPARATUS FOR RELEASING SUBMERGED FLOATS

[75] Inventors: Jean-François Patinet, Paris; Claude Guiomard, Les Lilas, both of France

[73] Assignee: Compagnie Generale pour les Developpements Operationnels des Richesses Sous-Marines "C. G. Doris", Paris, France

[21] Appl. No.: 798,428

[22] Filed: May 19, 1977

[30] Foreign Application Priority Data

May 25, 1976 [FR] France .................. 76 15782

[51] Int. Cl.² ............................................. B63C 11/00
[52] U.S. Cl. ................................................. 9/400; 9/8 R; 61/112; 248/62; 294/75

[58] Field of Search ............... 114/230, 244, 245, 293; 9/8 R, 400; 248/58, 62; 61/112, 107; 294/75

[56] References Cited

U.S. PATENT DOCUMENTS

| 1,773,838 | 8/1930 | Zifferer | 248/62 |
| 3,727,417 | 4/1973 | Shaw | 61/112 |
| 3,841,105 | 10/1974 | Cannon | 61/112 X |

Primary Examiner—Trygve M. Blix
Assistant Examiner—Sherman D. Basinger
Attorney, Agent, or Firm—Laurence R. Brown

[57] ABSTRACT

Apparatus for the release of submerged floats, characterized in that the float is connected to the structure it is intended to support by at least one opening collar which can be kept closed by a locking mechanism capable of being remotely controlled.

3 Claims, 2 Drawing Figures

APPARATUS FOR RELEASING SUBMERGED FLOATS

The present invention relates to the release of floats submerged in an aquatic medium. Although it can be applied to the laying of any structure on the earth bed of an aquatic medium, and in particular on the bed of the sea, one is here concerned more particularly, for example, with the laying of pipelines to be placed on the bed for connecting different production or storage stations — petroleum or not — between themselves or even to the shore. Until now, such a pipeline, towed to the desired location according to the "trail-rope" method, was suspended from a series of floats ballasted by chains. The pipeline, maintained at a distance from the bottom determined as a function of the length of chain and the positive buoyancy of the float, was towed in equilibrium under the different floats, divers being then sent down to detach the floats in succession, which caused the ballasted pipeline to settle on the bottom. Depending on the depth of intervention and the diameter of the pipeline, this method is occasionally dangerous for the divers who risk being injured by the cables or other attachments to the floats when they are released. Furthermore, it is rather inconvenient and lengthy and cannot be applied at too great depths. One could also envisage the use of a submarine for this operation but it is clear that this would be a great complication.

The invention seeks to provide a simple solution to this problem by creating a release apparatus that is easy to handle and which can be remotely controlled.

According to the invention, each float is connected to the pipeline or other structure to be supported by means of at least one opening collar which is held closed by a locking mechanism capable of being remotely controlled, for example by means of a cable or other hydraulic, electric or pyrotechnic system. The locking mechanism is preferably equipped with a safety device for preventing any unforeseen opening.

Several collars of this kind, the opening of which may or may not be controlled simultaneously, may be provided on the same float, the control being capable of being passed from float to float throughout its length or assembly of a line or structure.

The following description with reference to the attached drawings, given by way of non-limiting example, will make the method of carrying the invention into effect better understood, the details of both the drawings and the text forming, it will be understood, part of said invention.

Figure 1:
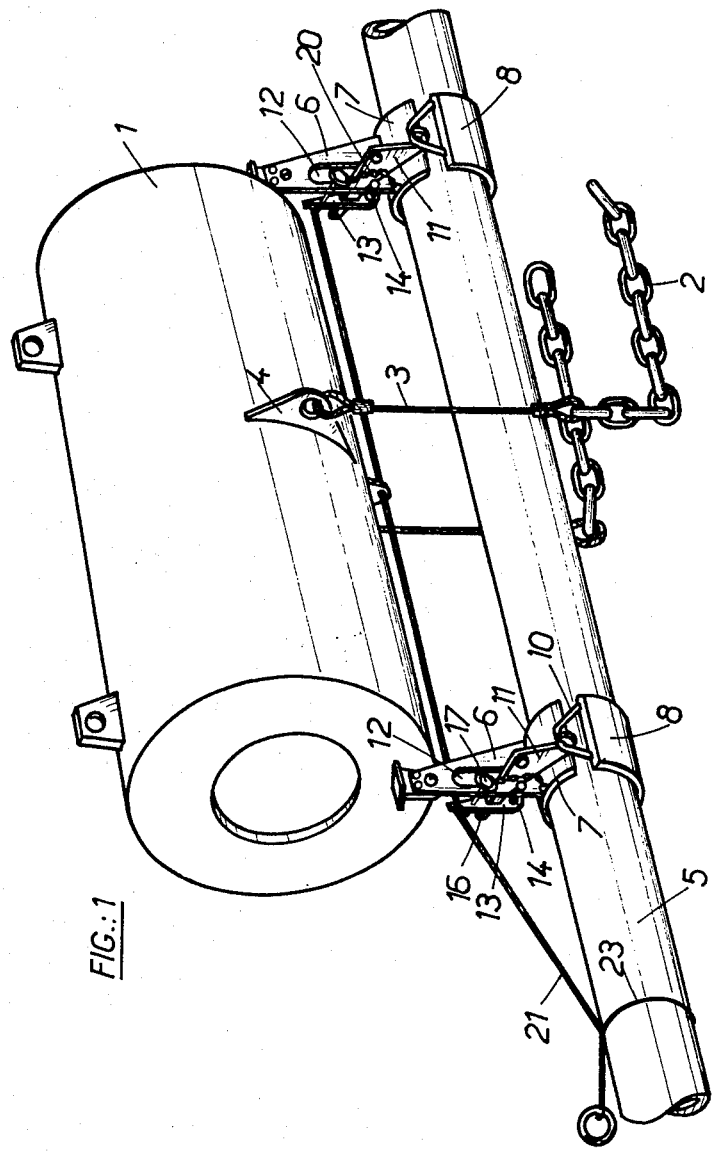
FIG. 1 is a perspective view showing a float attached to a pipeline.

In the example shown in the drawing, a float 1, provided with side chains 2 attached by means of cables 3 to lugs 4, is fixed to a pipeline 5 by means of two end plates 6. Instead of being rigidly connected to the float, the end plates could be attached to the latter by means of suspenders such as cables.

Each end plate is provided with a collar 7 comprising a half-cup integral with the end plate and an opening half-cup pivoted to the first at one end, for example by means of tightening bolts 9 allowing it to be fixed to the pipeline 5. At its other end, the half-cup 8 comprises a coupling with a hooking lug 10 in which can be engaged a hook member 11 which can rock in a vertical slot 12 in the end plate 6.

Figure 2:
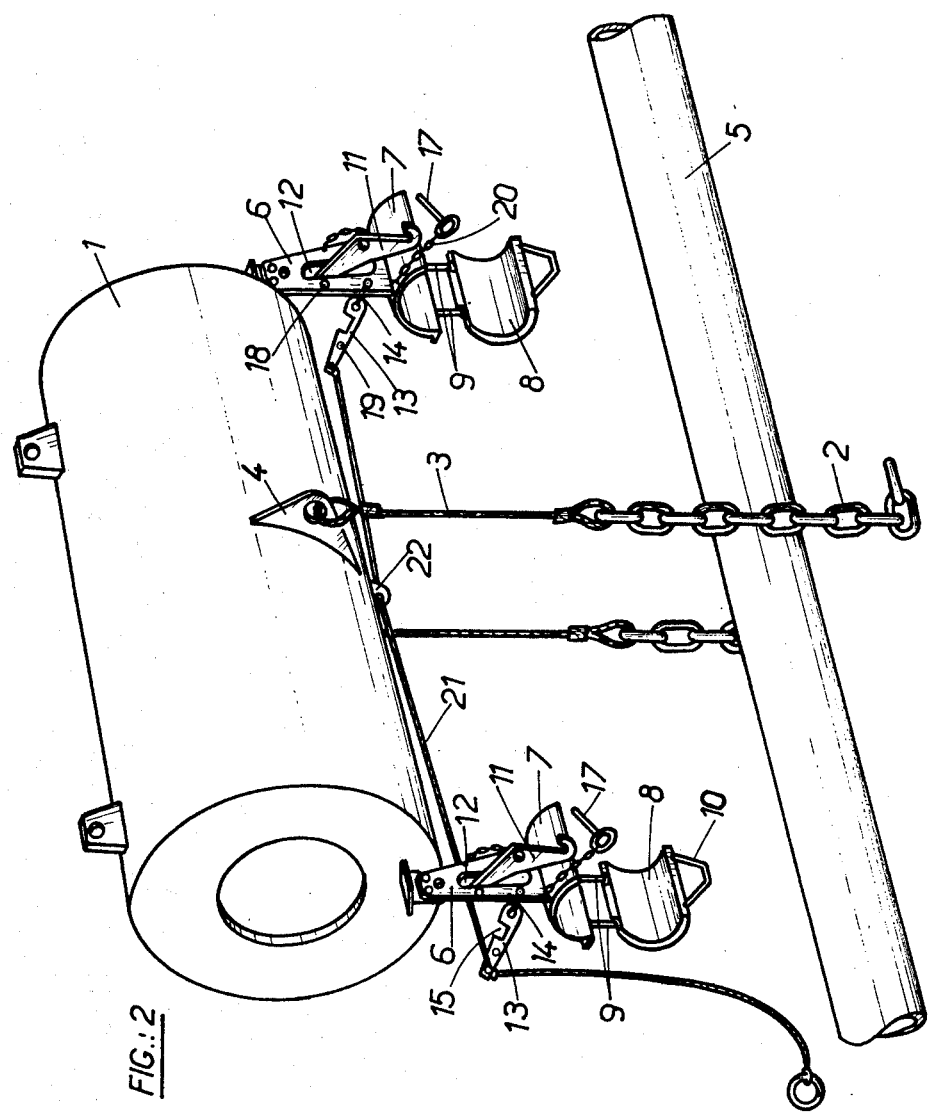
FIG. 2 shows this same float detached from the pipeline and starting to rise.

A locking plate 13 pivotted on the end plate about an axle 14 can be engaged, by means of a notch 15 formed therein (FIG. 2) with the tail 16 of the hook member 11, in order to maintain the latter in place in the slot 12 and thus maintain the collar 7 bound to the pipeline 5.

A safety pin 17, engaged in corresponding holes 18 and 19 in the end plate and the lug, prevents the untimely disengagement of the latter. This pin is attached to the end plate by a chain 20.

A control member such as a cable 21 is attached to the end of the lug 13 of one of the end plates and can also be attached to the lug 13 of the other end plate by passing through a retaining ring 22 on the float 1.

While the float is to remain fixed to the pipeline, the cable is also attached thereto by a line 23 (FIG. 1) which is easily broken.

Before the release operation, the safety pin 17 is removed and the line 23 is broken.

By pulling on the cable, the locking mechanisms consisting of the lugs and pawls are disengaged and the lower half cups open, allowing the float to rise.

The cable 21 could be extended from float to float, so as to permit of the simultaneous or successive release of several floats.

The operation could be carried out by a diver, from a submarine, or remotely.

It goes without saying that the embodiment described has been given by way of example only and could be modified, notably by the substitution of technical equivalents, without departing from the scope of the present invention.

We claim:

1. Apparatus for the controlled release of a submerged float which is releasably fastened to undersea structure, comprising in combination,
   a support member connected to said float and provided with a slot formed therethrough,
   a double-piece collar designed for fastening said float and said structure to one another, said collar comprising a first collar piece fast with said support member, a second collar piece, means at one end of said second collar piece for hinging the same to said first collar piece, and a hooking lug at the other end of said second collar piece,
   a hook member having a hooking head designed for engaging said hooking lug and an opposite tail threaded through said slot,
   a locking lever fulcrumed onto said support member and provided with a notch for engagement by said tail to lock said hook member in hooking position with said hooking lug, and
   a control member attached to said locking lever to actuate the same out of engagement with said tail of said hook member, whereby said hooking head and hooking lug are disengaged from one another and said second collar piece is allowed to swing about said hinging means for release of said collar from said structure.

2. Apparatus as claimed in claim 1, further comprising safety means for latching said locking lever into hook member tail engaging position.

3. Apparatus as claimed in claim 2, wherein said support member and said locking lever are respectively provided with mutually registrable holes, and wherein said safety means comprises a pin designed for being threaded through said holes.

* * * * *